Mar. 20, 1923.

W. J. MIX.
MACHINE FOR MAKING EGG CASE FILLERS.
FILED DEC. 19, 1921.

Witness:
R. E. Hamilton.

Inventor,
Wm. J. Mix,
By
Thorpe & Gerard
Attorneys.

Patented Mar. 20, 1923.

1,448,934

UNITED STATES PATENT OFFICE.

WILLIAM J. MIX, OF LEAVENWORTH, KANSAS, ASSIGNOR TO RISDON M. ODELL, OF LEAVENWORTH, KANSAS.

MACHINE FOR MAKING EGG-CASE FILLERS.

Application filed December 19, 1921. Serial No. 523,231.

*To all whom it may concern:*

Be it known that I, WILLIAM J. MIX, a citizen of the United States, and resident of Leavenworth, county of Leavenworth, State of Kansas, have invented a certain new and useful Improvement in Machines for Making Egg-Case Fillers, of which the following is a complete specification.

The present invention relates to apparatus for use in the manufacture of egg case fillers or cartons, and the principal end in view is to devise an efficient machine for the rapid production of fillers or cartons of this character from sheet material, such as paper or straw board or chipboard of suitable grade, these fillers having separate cells for receiving the eggs and protecting them from breakage in the handling and shipping from one point to another.

Since it is desired to reduce the production of these fillers to as economical a basis as possible, and hence to eliminate any special blank cutting or forming operations preliminary to the actual formation of the filler in its final or completed condition, I have devised a machine which requires only a preliminary creasing or scoring of the sheet material, and produce from such scored material the completed filler by practically a single operation of the improved machine.

Accordingly, the improved apparatus comprises a suitable type of feeding mechanism for feeding the sheets of scored material consecutively into the machine, where these sheets of material are acted upon by a plurality of molding dies for producing the egg cells, which dies are simultaneously actuated to execute what may be termed a gathering movement of all the dies both transversely and longitudinally of the sheet of material, whereby a puckering of the material is produced between the egg cells, the purpose of which puckered formation is to lend a cushioning effect for the protection of the eggs.

In the carrying out of the invention in practice, I provide two gangs of male and female dies arranged in operative relation to the path of sheet material, and mount these gangs of dies for movement into and out of engagement with the sheet material, and also for individual movement of the dies in directions both longitudinally and transversely of the sheet material, and provide operative connections adapted to be actuated in response to the movements of the gangs toward and from the paper to execute the gathering movements above referred to for effecting the puckering of the material at the same time that the egg cells are formed therein.

It is also sought to devise an improved form and arrangement of stripping means whereby the molded sheets of material are automatically removed from engagement with the dies at the end of each molding operation of the machine.

With the foregoing general objects in view, the invention will now be described by reference to one practical form of construction which I have devised for embodying the proposed improvements, after which the novel features and combinations will be particularly set forth and claimed.

Figure 4:
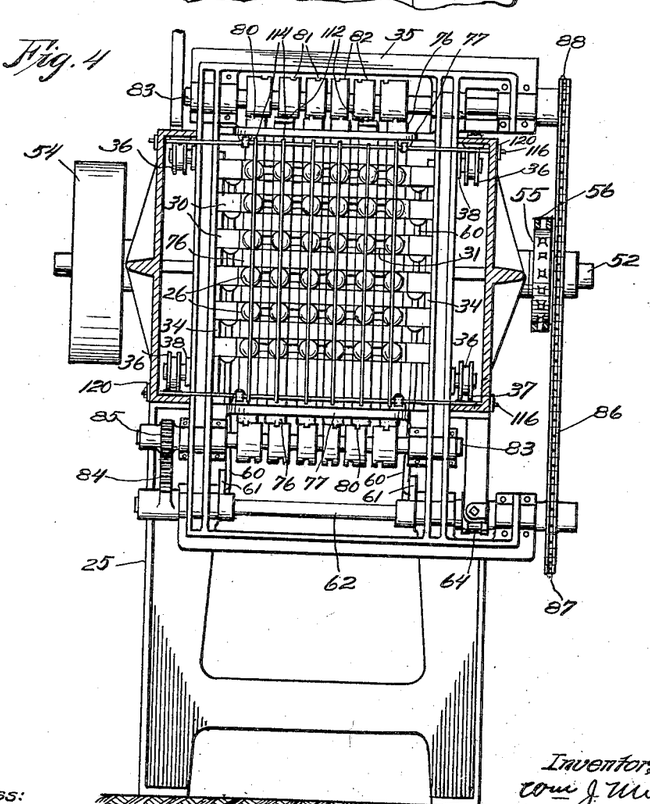
Figure 4 is a central vertical sectional view, taken on the line IV—IV of Figure 1, and omitting the feeding mechanism.
Figure 10:
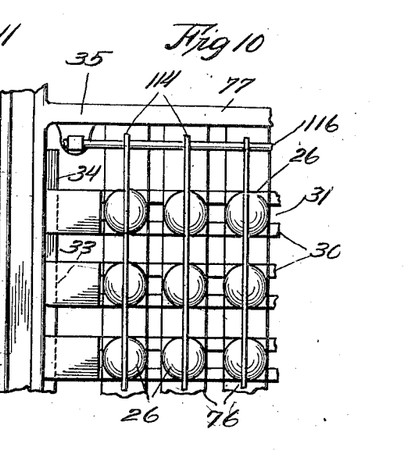
Figures 10 and 11 are enlarged face views showing portions of the sets or gangs of male and female dies, respectively.
Figure 11:
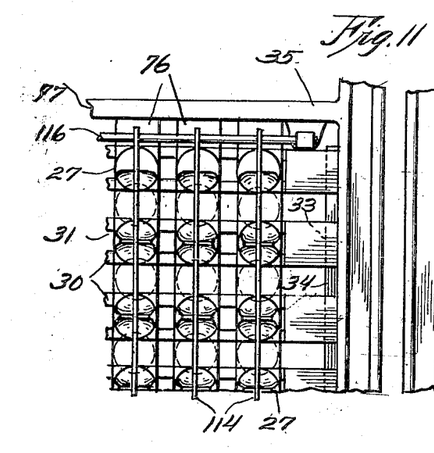

Referring now to the drawings in detail, these illustrate the improved apparatus as comprising a main machine frame 25, in the upper part of which are mounted two sets of die-molding devices arranged for oppositely reciprocating movement toward and from the path of movement of the sheet material which is fed in between the two sets or gangs of die-molding devices. One of the sets or gangs of molding elements comprises a plurality of male dies 26, while the other set of devices comprises a plurality of companion female die elements 27 adapted to match up and form as many complete female dies as there are male dies 26, the two sets or gangs also comprising a plurality of horizontal rows with the same number of dies to a row, and the dies of the several rows being also preferably arranged in vertical alignment as shown in Figures 4, 10 and 11.

Since the remaining characteristics of each set or gang of dies are substantially identical, both as regards the method of mounting and the mode of operating the same, it will be understood that the following detailed description will apply to the construction of both sets of die-molding devices. Each horizontal row of die elements is carried by a die carrier 30 which is formed with a longitudinal guide slot 31 for slidingly accommodating the dies, the latter being formed with squared and reduced neck portions 32 fitting said slot 31. The ends of the die carriers 30 are formed with grooves 33 for sliding engagement with vertical guide ribs 34 formed on the interior of a frame 35 forming a part of one of the die-head frame structures, whereby the dies are reciprocated into and out of molding position. The construction just described for affording the dies both a horizontal and vertical sliding movement obviously enables the same to have what may be termed a gathering movement both transversely and longitudinally of the egg filler sheet and simultaneously with the molding operation, which movement is produced by mechanism hereinafter to be described.

Figure 1:
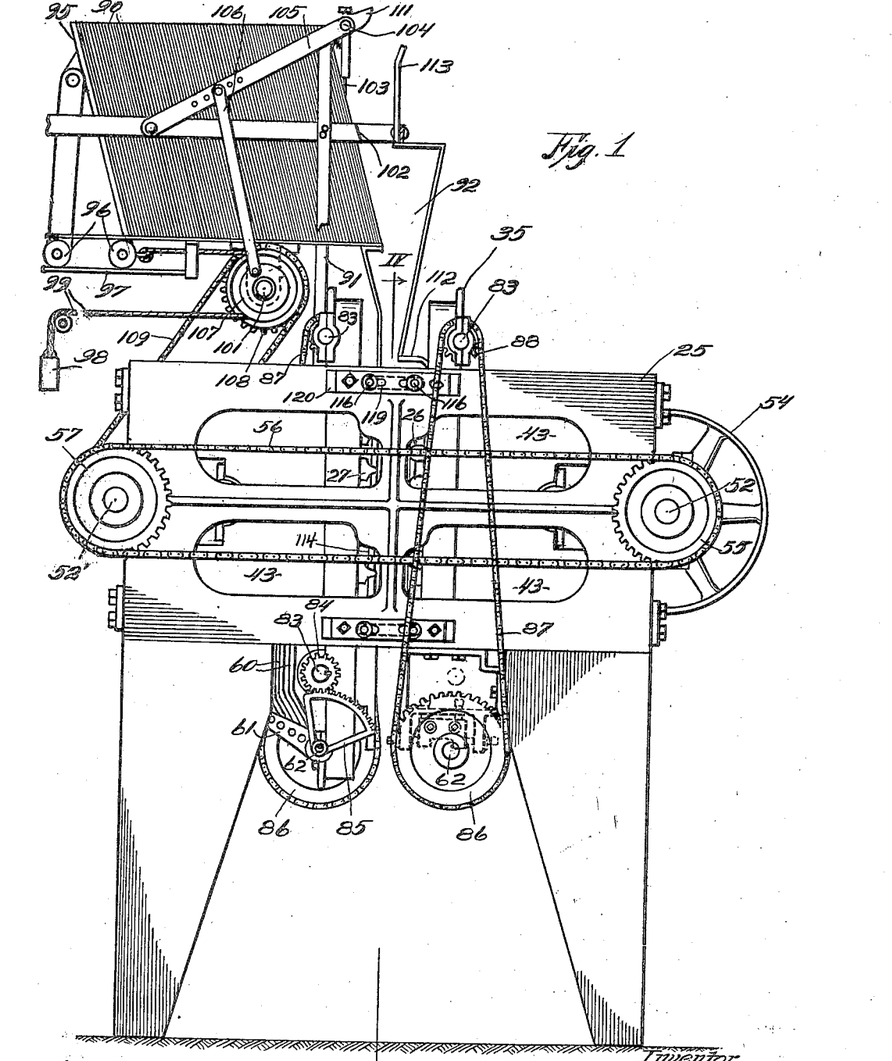
Figure 1 is a side elevation illustrating an egg case filler machine constructed in accordance with the present invention.
Figure 3:
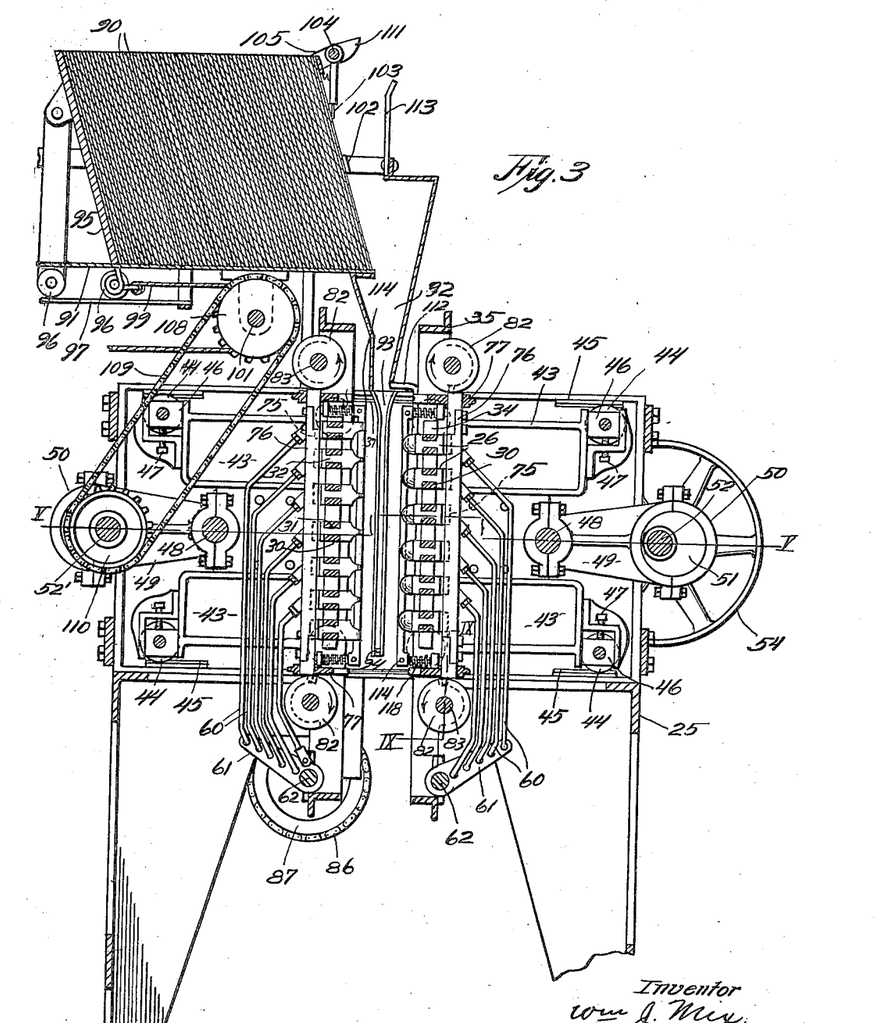
Figure 3 is a vertical sectional view, taken on the line III—III of Figure 2.

Each frame member 35 is supported and guided for rectilinear reciprocating movement by means of rollers 36 traveling along parallel tracks 37 rigid with the frame 25, said rollers being journaled upon bracket pieces 38 having ribs 39 engaging grooves 40 in the frame member 35 and adjustably secured thereto by means of clamp bolts 41; this adjustment is, of course, for the purpose of accurately positioning the die heads and bringing the two sets or gangs of die elements into proper alignment. Each frame member 35 is also connected by means of bolts 42 to a pair of die head frame members 43 which are supported and guided by means of rollers 44 operating along parallel tracks 45 rigid with the frame 25 (see Figures 3 and 5). The rollers 44 are journaled on bearing blocks 46 adapted to be adjusted by means of screws 47, in cooperation with the adjustment of the other supporting rollers 36. Supported by the frame members 43 is a transverse shaft 48 to which is pivotally connected a pair of operating links 49 having strap portions 50 operatively engaged with eccentrics 51 carried by a transverse drive shaft 52 mounted in bearings 53 at one end of the frame 25. One end of the shaft 52 is provided with a pulley 54 adapted to be belted to any suitable source of power, while the other end of said shaft is fitted with a sprocket wheel 55 connected by means of a sprocket chain 56 with a sprocket wheel 57 secured to one end of the corresponding drive shaft 52' at the other end of the machine (see Figures 1 and 5).

Figures 7, 8, 9:
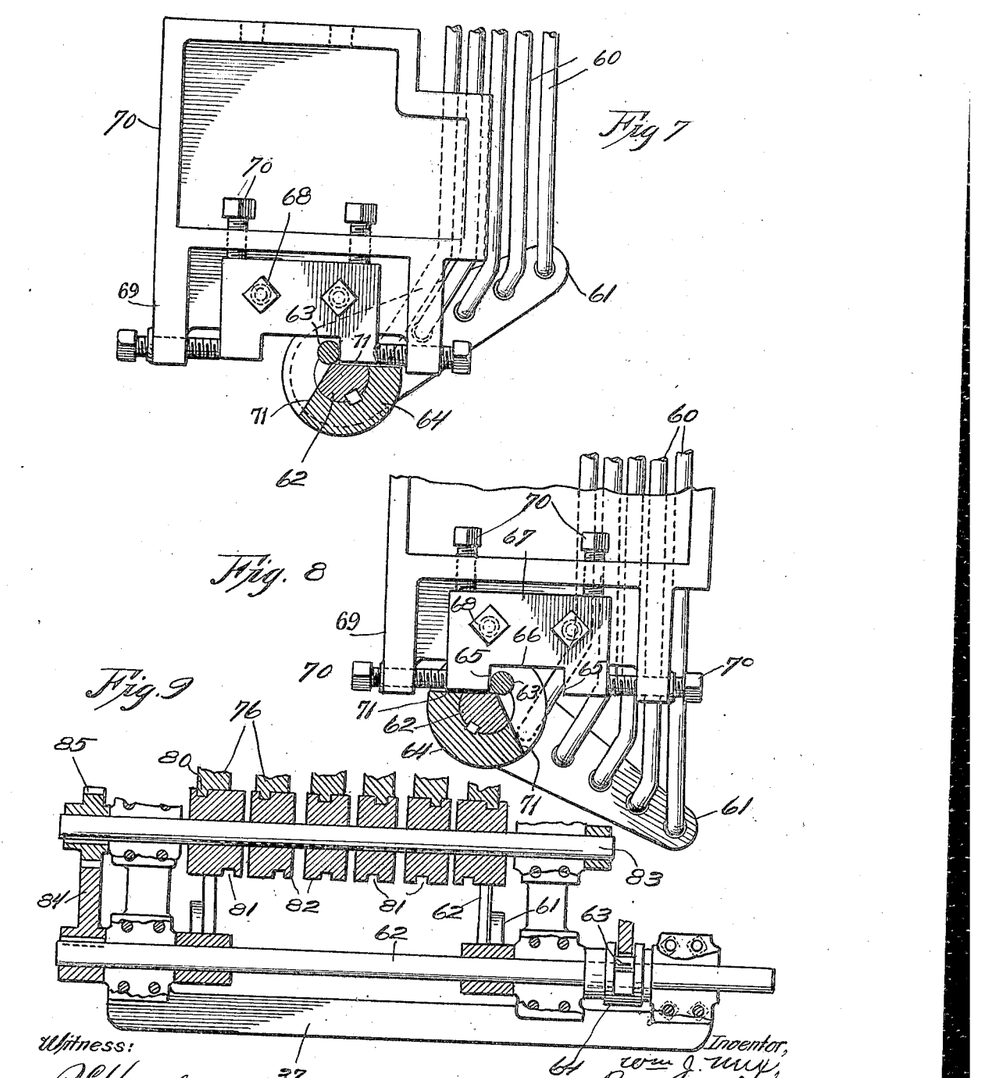
Figures 7 and 8 are enlarged detail sectional views illustrating in different positions one of the sets of operating connections for producing the longitudinal gathering movement of the dies.
Figure 9 is a detail section taken on the line IX—IX of Figure 3.

For the purpose of producing the longitudinal gathering movement of the dies, the opposite ends of each of the die carriers 30, excepting the lowermost carrier of each gang or set, are pivotally connected to the upper ends of links 60 which are extended downwardly into pivotal connection with an arm 61 mounted upon an oscillating shaft 62 journaled transversely in the lower portion of the frame 35. The connections between the links 60 and arm 61 are made at different points longitudinally thereon, appropriately spaced to produce the requisite degree of gathering movement of the dies downward in the direction of the lowermost row of dies, as the arm 61 is swung downward by the oscillation of the corresponding shaft 62. Each of the shafts 62 is oscillated by the reciprocating motion of the corresponding die-head structure, during which motion a pin 63 carried by a collar 64 secured to each shaft (see Figures 8 to 9) alternately engages shoulders 65 formed at the opposite ends of a recess 66 in a plate 67 secured by clamping screws 68 to a bracket 69 rigid with the frame 25 and adapted to be adjusted by a set of screws 70. Stop surfaces 71 are provided at opposite sides of the pin 63 for engagement with opposite ends of the plate 67 in limiting the oscillating movement of the shaft 62. In Figure 7 is illustrated the position of one of the arms 61 and corresponding links 60 for actuating the male dies, in initial position, that is, prior to the beginning of the longitudinal gathering movement of the dies, and in Figure 8 are shown the same parts in their relative positions at the completion of said gathering movement.

Figure 2:
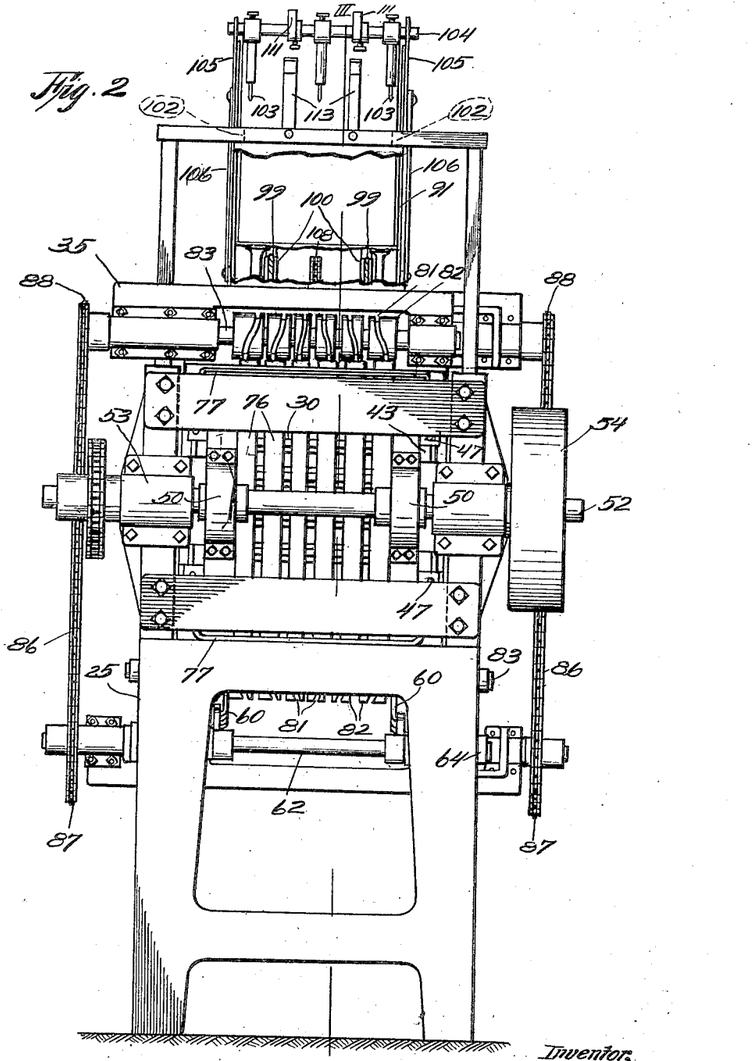
Figure 2 is a front elevation of the same.
Figure 5:
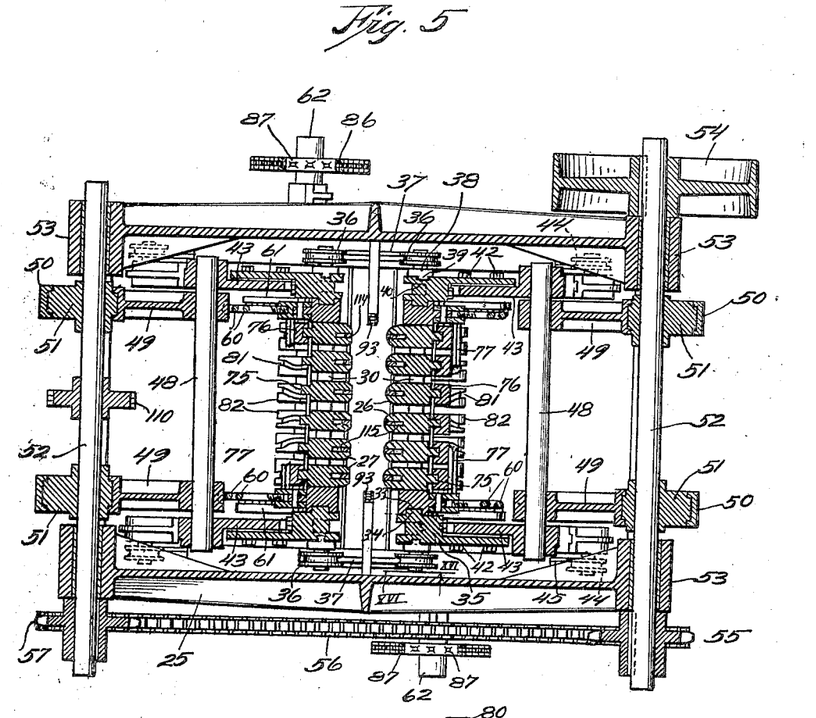
Figure 5 is a horizontal sectional view, representing a section taken on the line V—V of Figure 3.
Figure 6:
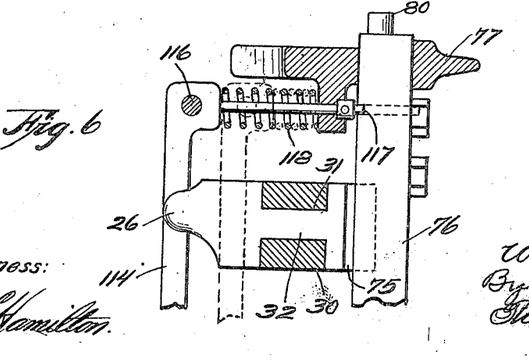
Figure 6 is an enlarged detail sectional view, showing a portion of one of the stripping devices.

For carrying out the transverse gathering movement of the dies, the outer ends of all the dies are tongued, as indicated at 75, for sliding engagement with a series of vertical bars 76, each set of which is guided and supported between transverse parallel cross-pieces 77 at the top and bottom of each die-head structure (see Figure 3), said cross-pieces being formed with suitable guide slots permitting limited lateral movement of the bars 76. The upper and lower ends of each of the bars 76 are provided with cam projections 80 for engagement in cam grooves 81 formed in a set of cams 82 on shafts 83, there being a shaft 83 arranged adjacent and parallel to each of the shafts 62 and carrying the cams 82 for the lower ends of the bars 76, these lower shafts 83 being oscillated from the adjacent shafts 62 by means of gear segments 84 meshing with pinions 85 keyed to the shafts 83 (see Figure 9). The upper sets of cams 82, or those engaged with the upper ends of the bars 76, are oscillated by means of sprocket chains 86 driven by sprocket wheels 87 on one of the outer ends of each of the shafts 62, and engaging a sprocket wheel 88 on one of the ends of each of the upper shafts 83, the drive connections just described being arranged at diagonally opposite sides of the machine, as indicated in Figures 2 and 5.

A supply of sheets 90 of the material from which the fillers are produced is maintained in a suitable magazine framework 91 above the frame 25, with the discharge end of said framework overlying a chute passage 92 adapted to direct the sheets into parallel guideways 93 having stop pins 94 at their lower ends for retaining the sheets in operative position for the molding action of the dies. A follower structure 95 mounted on supporting rollers 96 engaging tracks 97 serves to crowd the supply of sheets forward in response to the action of counterweights 98 connected to the follower structure 95 by means of flexible connections 99 trained around rollers 100 journaled on a shaft 101 mounted beneath the framework 91. The sheets 90 are crowded into rearwardly inclined position with the front sheet resting against stop or retaining fingers 102, where it is engaged by spring-actuated feeding fingers 103 carried by a rocker shaft 104 supported by levers 105 pivoted at the opposite sides of the framework 91. The feeding movement is produced by pitman links 106 connecting the levers 105 to crank wheels 107 on the opposite ends of the shaft 101, said shaft being rotated by means of a sprocket wheel 108 driven by a sprocket chain 109 from a sprocket wheel 110 secured to the shaft 52' (see Figure 3). In the downward or feeding movement of the fingers 103, the same are disengaged from the sheets 90 by means of cam pieces 111 on the shaft 104 engaging rigid posts 113 projecting upward from the framework 91 into the path of said cam pieces. The feeding movement of the fingers 103 is just sufficient to disengage the successive sheets from behind the stop or retaining fingers 102 and allow the sheets to drop into the chute passage 92 where they are temporarily supported during the molding operation upon the last previously fed sheet, upon a pair of lugs 112 projecting horizontally from the frame member 35 corresponding to the set of male dies; the retraction of the lugs 112 by the receding die frame, then allows the sheet to drop into the guideways 93 on to the stop pins 94 ready for the next molding operation.

Figures 12, 13, 18:
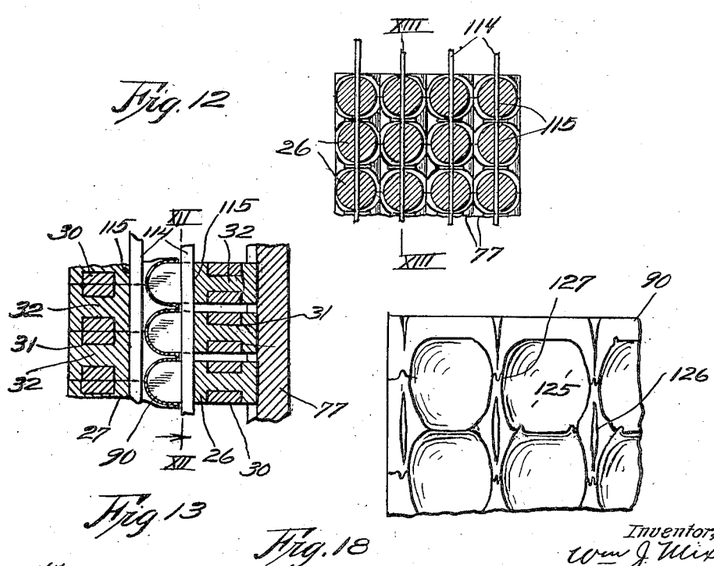
Figure 12 is a detail transverse section through a portion of one of the sets of dies (representing a section on the line XII—XII of Figure 13)
Figure 13 is a detail section taken on the line XIII—XIII of Figure 12.
Figure 18 is a similar view showing a portion of a filler as produced by the machine.
Figures 14, 15, 16:
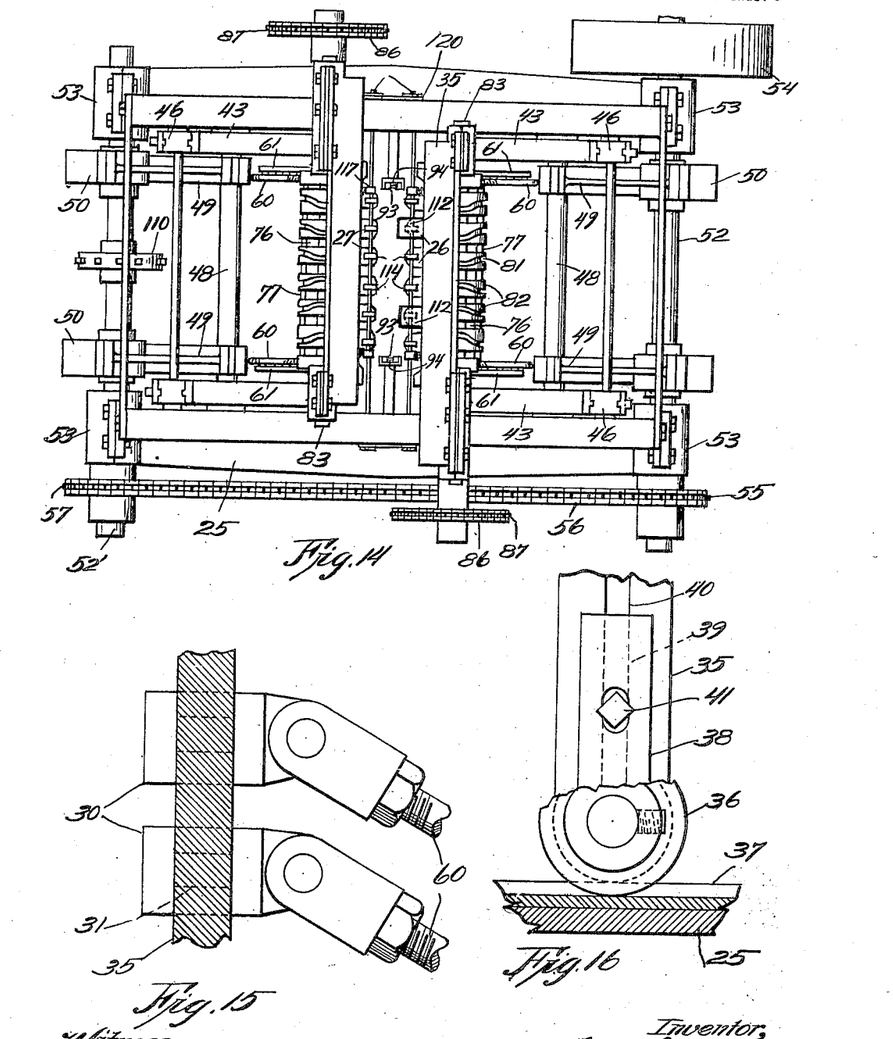
Figure 14 is a plan view of the machine, omitting the mechanism of feeding the sheets or egg-filler blanks.
Figure 15 is an enlarged detail view illustrating the form of connection to the die-carriers for producing the vertical gathering movement of the dies.
Figure 16 is a similar view of one of the forward die-head supporting rollers.

Mechanism is also provided for automatically stripping the molded sheets from the dies after each molding or die-stamping operation, this mechanism comprising vertical stripper bars 114 fitting in recesses 115 formed in the inner or operative faces of the dies, the upper and lower ends of said bars being carried by transverse rods 116 attached to the ends of horizontal pins 117 slidingly carried by the cross-pieces 77 and provided with coil springs 118 adapted to actuate the two sets of stripper bars, corresponding to the two sets of dies, normally toward each other. The ends of the rods 116 project through slots 119 in fixed brackets 120 on the frame 25, thereby restricting the stripper bars 114 to a slightly smaller extent of movement than the dies; the recesses 115 in the dies are deep enough to allow the dies to continue advancing for the actual molding operation (see Figures 5 and 13), while the stripper bars remain momentarily stationary without engaging the paper, after which the stripper bars will be returned by the springs 118 (as the dies recede) to the working faces of the dies for insuring the complete disengagement of the sheet from both sets of dies.

Figure 17:
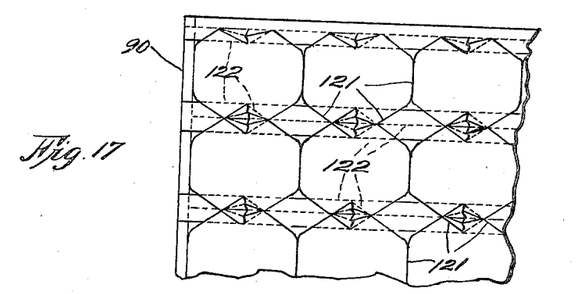
Figure 17 is a plan view of a portion of one of the egg-filler blanks prior to the molding operation.

Prior to being placed in the framework 91, the sheets 90 are scored by any suitable mechanism for facilitating the molding operation and producing the desired puckering of the material between the egg-cell recesses, this scoring preferably following a plan or pattern represented in Figure 17, where the full lines 121 represent lines of scoring on one side of the sheet, and the dotted lines 122 indicate lines of scoring on the reverse side of the sheet. As the machine is set in operation, the described feeding mechanism will discharge a sheet 90 into the chute passage 92, where it will be caught by the lugs 112 and retained thereon until the next withdrawal of the dies, where-upon it drops into the guideways 93 onto the pins 94. With the sheet in this position, and the dies so alined as to center them with the central points of the patterns scored on the sheet, the latter is acted upon by the next advance of the dies under the operation of the eccentrics 51. As the two sets of dies come together, the described sets of connections for producing the gathering motion of the dies are brought into operation, for not only drawing the dies in the horizontal rows closer together toward the center of each row (due to the action of the cams 82) but also crowding together the dies in the vertical rows, in a downward direction, by the action of the connections 60 to the oscillating arms 61. This results in the formation of the egg-cell recesses 125 without any appreciable stretching of the sheet of material, and the lines of scoring 121 and 122 are such as to facilitate the formation of the recesses and also producing the peculiarly puckered and folded structure represented in Figure 18, in which corrugated ridges 126 are produced between the rows of cells, said ridges connecting with each other by interlacing corrugations, as indicated at 127. Such a structure provides a filler which is not only strengthened in all its parts, but also possesses the necessary shock absorbing or cushioning properties in the required degree.

While I have described and illustrated what I now regard as the preferred form of construction, I desire to reserve the right to make such changes or modifications as may fairly fall within the scope of the appended claims.

What I claim is:

1. The process of making egg-case fillers which consists in molding a plurality of egg-receiving cells in a sheet of material, and simultaneously gathering said cells by contracting movements both longitudinally and laterally of the sheet.

2. The process of making egg-case fillers which consists in stamping a plurality of egg-receiving cells in a sheet of material, and simultaneously gathering said cells by producing a drawing movement of the stamping means both longitudinally and laterally of the sheet.

3. A machine for making egg-case fillers comprising a plurality of movable egg-cell molding dies, means for feeding a sheet of material across said dies, and means for actuating said dies into engagement with said sheet and simultaneously effecting a gathering movement of said dies.

4. A machine for making egg-case fillers comprising a plurality of rows of movable egg-cell molding dies, means for feeding a sheet of material across said dies, and means for actuating said dies into engagement with sheet and simultaneously effecting a gathering movement of said dies both longitudinally and laterally of the sheet.

5. A machine for making egg-case fillers comprising a gang of egg-cell molding male dies, a gang of female dies arranged in operative relation to said male dies, means for feeding a sheet of material between said gangs of dies, and means for actuating said gangs of dies into engagement with said sheet and simultaneously effecting a gathering movement of said dies both longitudinally and laterally of the sheet.

6. A machine for making egg-case fillers comprising a gang of egg-cell molding male dies, arranged in a plurality of horizontal rows with the dies of each row mounted for horizontal sliding movement, a gang of horizontally movable female dies arranged in horizontal rows and in operative relation to said male dies, means for feeding a sheet of material between said gangs of dies, and means for actuating said gangs of dies into engagement with said sheet and simultaneously effecting a horizontal gathering movement of the dies transversely of said sheet.

7. A machine for making egg-case fillers comprising a gang of egg-cell molding male dies, arranged in a plurality of horizontal rows with the dies of each row mounted for vertical sliding movement, a gang of vertically movable female dies arranged in horizontal rows and in operative relation to said male dies, means for feeding a sheet of material between said gangs of dies, and means for actuating said gangs of dies into engagement with said sheet and simultaneously effecting a vertical gathering movement of the dies longitudinally of said sheet.

8. A machine for making egg-case fillers comprising a gang of egg-cell molding male dies, arranged in a plurality of horizontal rows with the dies of each row mounted for both horizontal and vertical sliding movement, a gang of horizontally and vertically sliding female dies arranged in horizontal rows and in operative relation to said male dies, means for feeding a sheet of material between said gangs of dies, and means for actuating said gangs of dies into engagement with said sheet and simultaneously effecting a horizontal and vertical gathering movement of the dies both transversely and longitudinally of the sheet.

9. A machine for making egg-case fillers comprising a plurality of movable egg-cell molding dies, means for feeding a sheet of material across said dies, means for reciprocating said dies into and out of engagement with said sheet and simultaneously effecting a gathering movement of said dies, and automatic stripping means for disengaging said sheet from the dies during the retracting movement of the latter.

10. A machine for making egg-case fillers comprising a gang of egg-cell molding male dies, arranged in a plurality of horizontal rows with the dies of each row mounted for horizontal sliding movement, a gang of horizontally movable female dies arranged in horizontal rows and in operative relation to said male dies, all of said dies excepting those of the lowermost row of gang being also mounted for vertical sliding movement, means for feeding a sheet of material between said gangs of dies, and means for actuating said gangs of dies into engagement with said sheet, said actuating means also operating to effect a horizontal gathering movement of all the dies while simultaneously effecting a vertical gathering movement of the upper rows of dies in the direction of the lowermost rows of said dies.

11. A machine for making egg-case fillers comprising a plurality of vertically movable die-carriers each carrying a row of egg-cell molding dies, means for feeding a sheet of material across said dies, means for actuating said die-carriers to engage the dies with said sheet, and connections operated by said last mentioned means to produce a gathering movement of said die-carriers longitudinally of said sheet.

12. A machine for making egg-case fillers comprising a plurality of vertically movable die-carriers each carrying a row of egg-cell molding dies mounted for movement longitudinally of said carriers, means for feeding a sheet of material across said dies, means for actuating said die-carriers to engage the dies with said sheet, and connections operated by said last mentioned means to produce a gathering movement of said die-carriers longitudinally of said sheet and simultaneously effecting a gathering movement of the dies of each carrier transversely of the sheet.

13. A machine for making egg-case fillers comprising a plurality of vertically movable die-carriers each carrying a row of egg-cell molding male dies, a plurality of vertically movable die-carriers carrying a row of egg-cell molding female dies in operative relation to said male dies, means for feeding a sheet of material between said male and female dies, means for actuating said die-carriers to engage said dies with said sheet, and connections operated by said last means to produce a gathering movement of all said die-carriers longitudinally of the sheet.

14. A machine for making egg-case fillers comprising a plurality of vertically movable die-carriers each carrying a row of egg-cell molding male dies, a plurality of vertically movable die-carriers carrying a row of egg-cell molding female dies in operative relation to said male dies, all of said dies being mounted for horizontal sliding movement in their respective die-carriers, means for feeding a sheet of material between male and female dies, means for actuating said die-carriers to engage said dies with said sheet, and connections operated by said last mentioned means to produce a vertical gathering movement of said die-carriers longitudinally of said sheet and simultaneously effecting a horizontal gathering movement of the dies of each carrier transversely of the sheet.

15. A machine for making egg-case fillers comprising a plurality of vertically movable die-carriers each carrying a row of egg-cell molding male dies, a plurality of vertically movable companion die-carriers each carrying a row of egg-cell molding female dies in operative relation to said male dies, a vertically immovable die-carrier carrying egg-cell molding male dies and located beneath said first die-carriers, a vertically immovable die-carrier carrying egg-cell molding female dies and located beneath said companion die-carriers, means for feeding a sheet of material between said male and female dies, means for actuating said die-carriers to engage said dies with said sheet, and connections operated by said last mentioned means to produce a vertical gathering movement of said movable die-carriers longitudinally of said sheet.

16. A machine for making egg-case fillers comprising a plurality of vertically movable die-carriers each carrying a row of egg-cell molding male dies, a plurality of vertically movable companion die-carriers each carrying a row of egg-cell molding female dies in operative relation to said male dies, a vertically immovable die-carrier carrying egg-cell molding male dies and located beneath said first die-carriers, a vertically immovable die-carrier carrying egg-cell molding female dies and located beneath said companion die-carriers, all of said dies being mounted for horizontal sliding movement along their respective die-carriers, means for feeding a sheet of material between said male and female dies, means for actuating said die-carriers to engage said dies with said sheet, and connections operated by said last mentioned means to produce a vertical gathering movement of said movable die-carriers longitudinally of said sheet, and simultaneously effecting a horizontal gathering movement of the dies of each carrier transversely of the sheet.

In witness whereof I hereunto affix my signature.

WILLIAM J. MIX.